(12) United States Patent
Harrison (10) Patent No.: US 11,327,156 B2
(45) Date of Patent: May 10, 2022

(54) REINFORCEMENT LEARNING ENGINE FOR A RADAR SYSTEM

(71) Applicant: Metawave Corporation, Palo Alto, CA (US)

(72) Inventor: Matthew Paul Harrison, Palo Alto, CA (US)

(*) Notice: Subject to any disclaimer, the term of this patent is extended or adjusted under 35 U.S.C. 154(b) by 186 days.

(21) Appl. No.: 16/395,208

(22) Filed: Apr. 25, 2019

(65) Prior Publication Data

US 2019/0331768 A1 Oct. 31, 2019

Related U.S. Application Data

(60) Provisional application No. 62/663,243, filed on Apr. 26, 2018.

(51) Int. Cl.
| | |
|---|---|
| *G01S 7/41* | (2006.01) |
| *G01S 13/72* | (2006.01) |
| *G01S 13/86* | (2006.01) |
| *G01S 13/931* | (2020.01) |
| *G01S 13/00* | (2006.01) |

(52) U.S. Cl.
CPC ............ *G01S 7/417* (2013.01); *G01S 13/726* (2013.01); *G01S 13/865* (2013.01); *G01S 13/867* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 6,492,949 B1 | 12/2002 | Breglia et al. | |
| 9,977,430 B2* | 5/2018 | Shalev-Shwartz | ... G05D 1/0055 |
| 10,019,011 B1* | 7/2018 | Green | ............. G05D 1/0088 |
| 10,061,316 B2* | 8/2018 | Nishi | ............. G05D 1/0088 |
| 10,083,523 B2* | 9/2018 | Versace | ............. G01S 7/41 |
| 10,176,596 B1* | 1/2019 | Mou | ............. G01S 17/931 |
| 10,205,457 B1 | 2/2019 | Josefsberg et al. | |
| 10,520,581 B2* | 12/2019 | Schuh | ............. G01S 13/931 |
| 2013/0241765 A1 | 9/2013 | Kozma et al. | |
| 2018/0232947 A1 | 8/2018 | Nehmadi et al. | |

OTHER PUBLICATIONS

Entry for the term "Software Engine" in Wikipedia on the Internet; no author listed; retrieved on Apr. 21, 2021; page last edited on Jan. 15, 2021. (Year: 2021).*

Silver, D. et al., "Mastering the game of Go with deep neural networks and tree search;" Nature, vol. 529, pp. 484-489 (2016).

(Continued)

*Primary Examiner* — Bernarr E Gregory
(74) *Attorney, Agent, or Firm* — Sandra Lynn Godsey (57) ABSTRACT

Examples disclosed herein relate to an autonomous driving system in a vehicle, including a radar system with a reinforcement learning engine to control a beam steering antenna and identity targets in a path and a surrounding environment of the vehicle, and a sensor fusion module to receive information from the radar system on the identified targets and compare the information received from the radar system to information received from at least one sensor in the vehicle.

20 Claims, 9 Drawing Sheets

(56) References Cited

OTHER PUBLICATIONS

Gu, Shixiang & Lillicrap, Timothy & Sutskever, Ilya & Levine, Sergey; "Continuous Deep Q-Learning with Model-based Acceleration," University of Cambridge 2Max Planck Institute for Intelligent Systems 3Google Brain 4 Google DeepMind, (2016).

Bar Hilleli et al., "Deep Learning of Robotic Tasks without a Simulator using Strong and Weak Human Supervision," Department of Computer ScienceTechnion—Israel Institute of Technology Haifa, Israel, pp. 1-14, Mar. 2017.

Silver, D. et al., "Deterministic Policy Gradient Algorithms," 31st International Conference on Machine Learning, ICML, 2014.

Mnih, Volodymyr et al., Human-level control through deep reinforcement learning, Nature, vol. 518, pp. 529-533, Feb. 2015.

Bohez, Steven et al., "Sensor Fusion for Robot Control through Deep Reinforcement Learning," Mar. 2017.

Sutton, Richard et al., "Between MDPs and Semi-MDPs: A Framework for Temporal Abstraction in Reinforcement Learning," Artificial Intelligence vol. 112, 2019.

Zhang, Fangyi et al, "Towards Vision-Based Deep Reinforcement Learning for Robotic Motion Control," ARC Centre of Excellence for Robotic Vision (ACRV), Queensland University of Technology (QUT), 2015.

J. Ahtiainen et. al., "Radar based detection and tracking of a walking human," paper, Espoo, Finland, pp. 1-6, 2010.

Dr. Uwe Kuhnau, "Sensor Development for Autonomous Driving," IWPC Workshop on Automotive Radar Sensors for Semi-Automatic and Autonomous Driving and Parking Systems, Wolfsburg, pp. 1-25, Feb. 2017.

J. Ahtiainen et. al., "Radar based detection and tracking of a walking human," International Journal of Advanced Robotic Systems, pp. 1-16, 2014.

L. Danielsson, "Tracking and Radar Sensor Modelling for Automotive Safety Systems," Thesis for the Degree of Doctor of Philosopie, Department of Signals and Systems, Signal Processing Group, Chalmers University of Technology, GoetenboTrg, Sweden, pp. 1-102, 2010.

S. Jeong, et al., "A Multi-Beam and Multi-Range Radar WITHFMCW and Digital Beam Forming for Automotive Applications," Progress in Elctromagnetics Research, vol. 124, pp. 285-299, 2012.

R. Rouveure, et al., "Radar Imager for Perception and Mapping in Outdoor Environments," Advanced Concepts for Intelligent Vision Systems: 11th International Conference (ACIVS), Bordeaux, France, pp. 618-628, Sep. 2009.

S. Carpenter, "Autonomous Vehicle Radar: Improving Radar Performance with Simulation," White Paper, High Frequency/Electronics Business Unit, ANSYS, Canonsburg, PA, pp. 1-14, 2017.

G. Reina, et. al., "Short-Range Radar Perception in Outdoor Environments," Department of Engineering for Innovation, University of Salento, Lecce, Italy, Springer Verlag, Berlin, pp. 265-276, 2011.

S. Milch et al., "Pedestrian Detection with Radar and Computer Vision," Smart Microwave Sensors GmbH, Braunschweig, Germany, pp. 1-7, 2001.

F. Fölster, et al., "Signal Processing Structure For Automotive Radar," Frequenz, vol. 60, Issue 1-2, pp. 20-24, 2006.

P. Molchanov, "Radar Target Classification by Micro-Doppler Contributions," Thesis for the degree of Doctor of Science in Technology, Tampere University of Technology, Tampere, Finland, Publication 1255, pp. 1-187, Oct. 2014.

G. Reina, et. al., "A Self-Learning Ground Classifier using Radar Features," Springer Tracts in Advanced Robotics, pp. 1-14, Dec. 2014.

S. Park, et al., "A Neural Network Approach to Target Classification for Active Safety System Using Microwave Radar," Expert Systems with Applications, Elsevier, vol. 37, Issue 3, pp. 2340-2346, Mar. 2010.

M. Töns et al.,"Radar Sensors and Sensor Platform used for Pedestrian Protection in the EC-funded Project SAVE-U," IEEE Intelligent Vehicles Symposium, 2004, Parma, Italy, pp. 813-818, Jun. 2004.

S. Haykin, "Radar Vision," IEEE International Conference on Radar, Arlington, VA, pp. 585-588, May 1990.

\* cited by examiner

REINFORCEMENT LEARNING ENGINE FOR A RADAR SYSTEM

CROSS-REFERENCE TO RELATED APPLICATIONS

This application claims priority to U.S. Provisional Application No. 62/663,243, filed on Apr. 26, 2018, and incorporated herein by reference in their entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. The requirements for object and image detection are critical and specify the time required to capture data, process it and turn it into action. All this while ensuring accuracy, consistency and cost optimization.

An aspect of making this work is the ability to detect and classify objects in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

A radar system with a reinforcement learning engine is disclosed. The radar system is suitable for many different applications and can be deployed in a variety of different environments and configurations. In various examples, the radar system is used in an autonomous driving vehicle to identify and classify objects in the surrounding environment in all-weather conditions and beyond line-of-sight. As described in more detail below, the radar system has a meta-structure ("MTS") antenna capable of steering beams with controllable parameters in any desired direction in a 360° field of view. The reinforcement learning engine in the radar system provides control of the MTS antenna in response to a detected and identified target in the surrounding environment. This enables the radar system to provide a dynamically controllable and steerable antenna beam that can focus on one or multiple portions within a 360° field of view, while optimizing the antenna capabilities and reducing the processing time and computational complexity for identification of objects therein.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
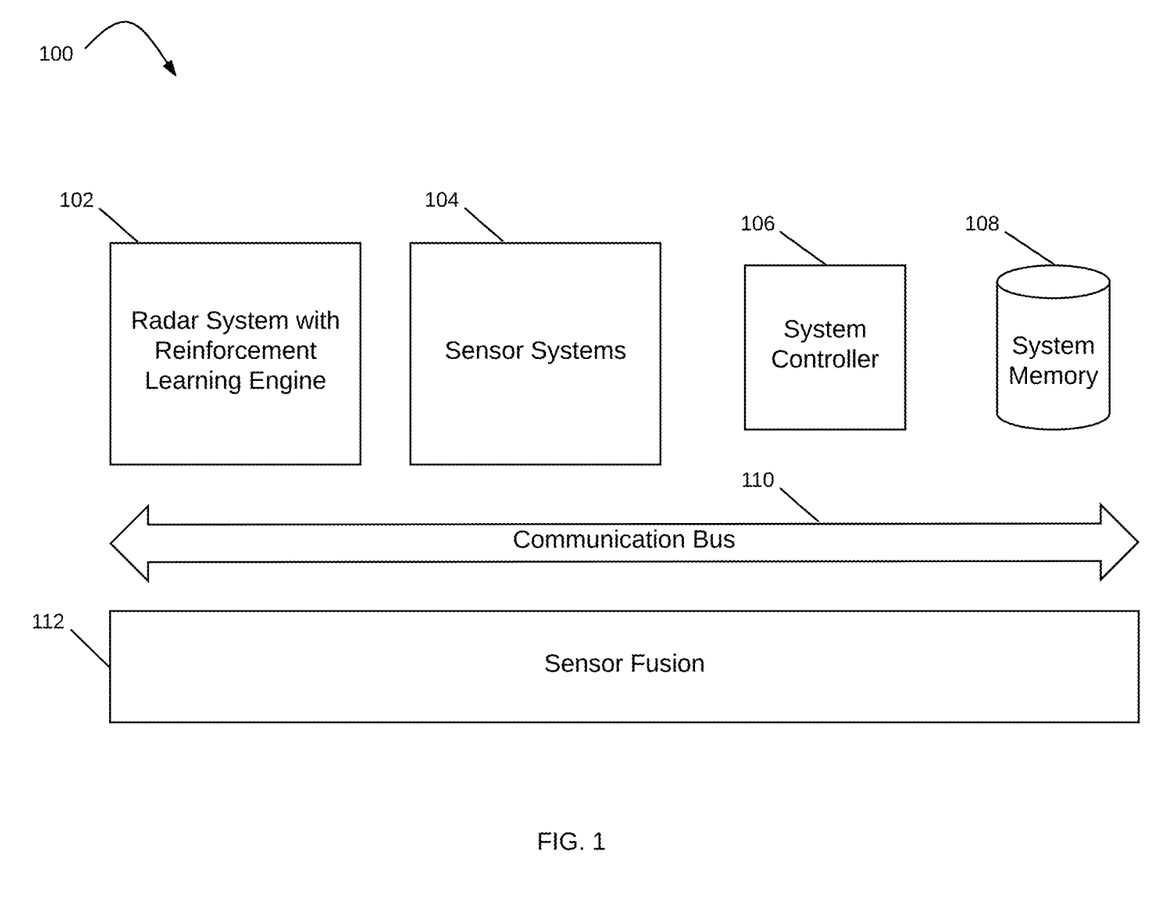
FIG. 1 is a schematic diagram of an autonomous driving system in accordance with various examples.

Referring now to FIG. 1, a schematic diagram of an autonomous driving system in accordance with various examples is described. Autonomous driving system 100 is a system for use in a vehicle that provides some or full automation of driving functions. The driving functions may include, for example, steering, accelerating, braking and monitoring the surrounding environment and driving conditions to respond to events, such as changing lanes or speed when needed to avoid traffic, crossing pedestrians, animals, and so on. Autonomous driving system 100 includes a radar system with reinforcement learning engine 102, sensor systems 104, system controller 106, system memory 108, communication bus 110 and sensor fusion 112. It is appreciated that this configuration of autonomous driving system 100 is an example and is not meant to be limiting to the specific structure illustrated in FIG. 1. Additional systems and modules not shown in FIG. 1 may be included in autonomous driving system 100.

Radar system with reinforcement learning engine 102 includes an MTS antenna for providing dynamically controllable and steerable beams that can focus on one or multiple portions within a 360° field of view. The beams radiated from the MTS antenna are reflected back from targets in the vehicle's surrounding environment and received and processed by the radar system 102 to detect and identify the targets. As generally used herein, the targets may include structural elements in the environment such as walls, buildings, road center medians, and other objects, as well as vehicles, pedestrians, bystanders, cyclists, animals and so on. The radar system 102 has a reinforcement learning engine that is trained to detect and identify the targets and control the MTS antenna module as desired.

Sensor systems 104 may include multiple sensors in the vehicle, such as cameras, lidar, ultrasound, communication sensors, infrastructure sensors and other sensors to determine a condition of the surrounding environment and in particular, to comprehend the path of the vehicle so as to anticipate, identify and detect the presence of a target in the vehicle's path. Data from radar system 102 and sensor systems 104 may be combined in sensor fusion module 112 to improve the target detection and identification performance of autonomous driving system 100. Sensor fusion module 112 is controlled by system controller 106, which may also interact with and control other modules and systems in the vehicle. For example, system controller 106 may turn the different sensors in sensor systems 104 on and off as desired, or provide instructions to the vehicle to stop upon identifying a driving hazard (e.g., deer, pedestrian, cyclist, or another vehicle suddenly appearing in the vehicle's path, flying debris, etc.)

All modules and systems in autonomous driving system 100 communicate with each other through communication bus 110. Autonomous driving system 100 also includes system memory 108, which may store information and data (e.g., static and dynamic data) used for operation of system 100 and the vehicle using system 100.

Figure 2:
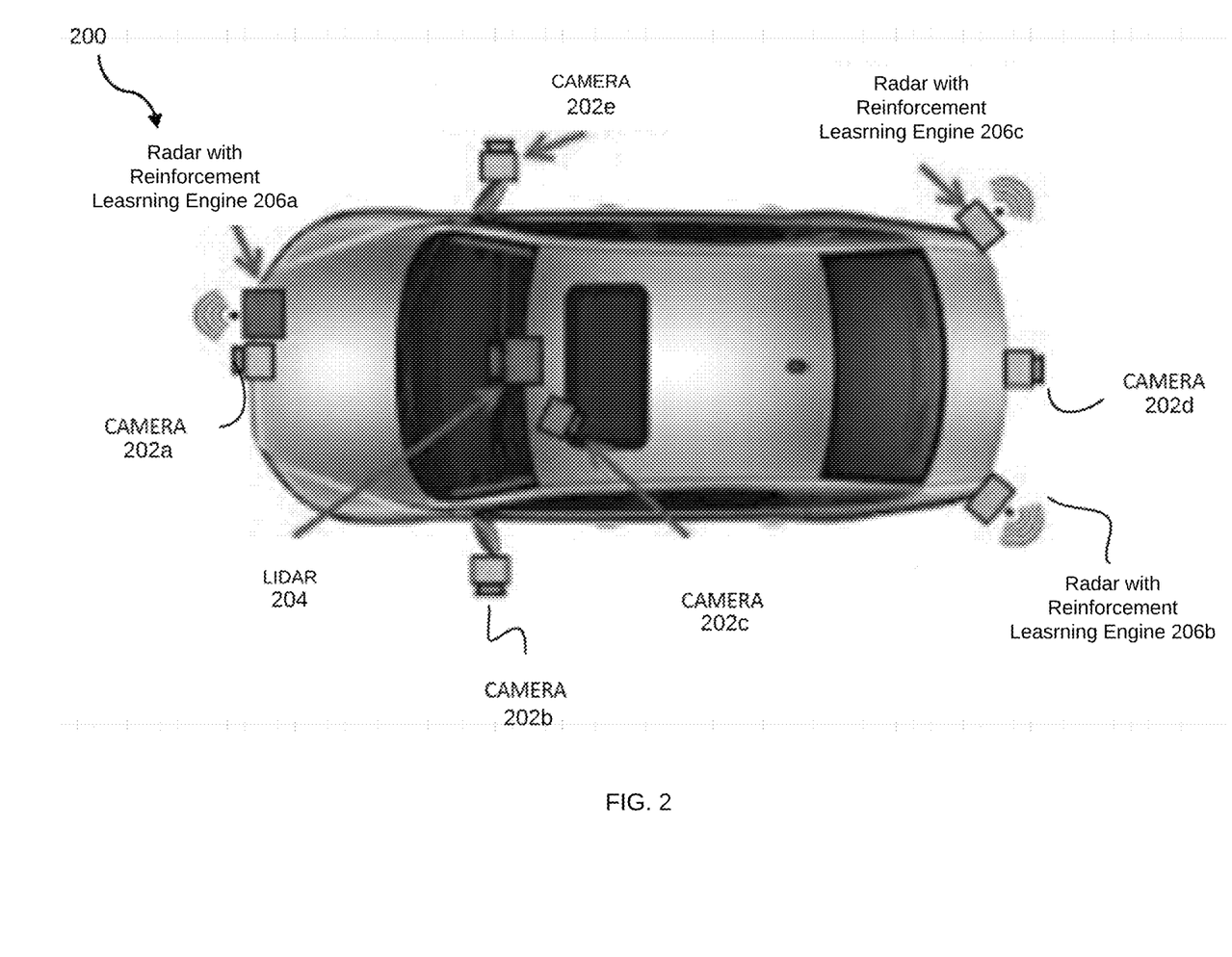
FIG. 2 illustrates an example sensor placement in a vehicle.

FIG. 2 illustrates sensor placement on a vehicle, in accordance with various examples. Vehicle 200 may include multiple types of sensors, such as cameras 202a-e, lidar sensor 204 and radar sensors 206a-c. Sensors 202a-e, 204 and 206a-c may be a part of a sensor systems module such as sensor systems module 104 in autonomous driving system 100 of FIG. 1. In various examples, one or more of radar sensors 206a-c may be implemented as radar system with reinforcement learning engine 102 of FIG. 1. The data from sensors 202a-e, lidar sensor 204 and radar sensors 206a-c may be combined in a sensor fusion module in vehicle 200 as described above (e.g., sensor fusion module 112 shown in FIG. 1).

Each type of sensor in vehicle 200 has different capabilities and weaknesses. Camera sensors such as cameras 202a-e are currently used in ADAS systems to assist drivers in driving functions such as parking. Cameras are able to capture texture, color and contrast information at a high level of detail, but similar to the human eye, they are susceptible to adverse weather conditions and variations in lighting. Lidar sensors such as lidar sensor 204 measure the distance to an object by calculating the time taken by a pulse of light to travel to an object and back to the sensor. When positioned on top of a vehicle as shown with lidar sensor 204, lidars are able to provide a 360° 3D view of the surrounding environment. However, lidar sensors are still prohibitively expensive, bulky in size, sensitive to weather conditions and are limited to short ranges (typically <200 m), with resolution decreasing with range.

Radars, on the other hand, have been used in vehicles for many years and operate in all-weather conditions. Radars also use far less processing than the other types of sensors as they generate much less data. And as described in more detail below, one or more radar sensors 206a-c when implemented as radar system with reinforcement engine 102 of FIG. 1, are able to steer a highly-directive RF beam that can detect and identify targets in a full 360° field of view regardless of weather conditions and surrounding environments.

Figure 3:
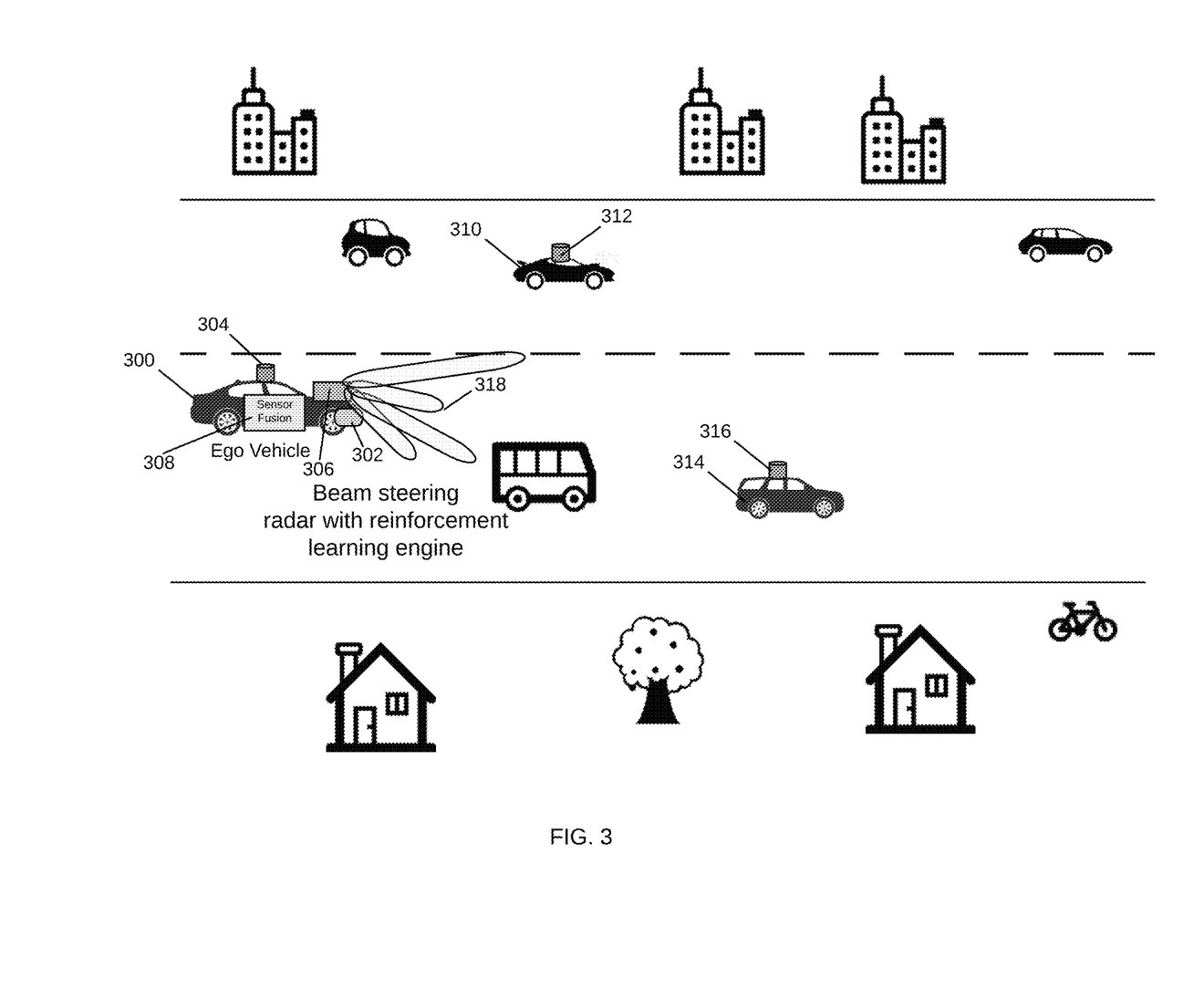
FIG. 3 illustrates an example environment in which the vehicle of FIG. 2 is used to detect and identify objects.

FIG. 3 illustrates an example environment in which the vehicle of FIG. 2 is used to detect and identify objects. Vehicle 300 is an autonomous vehicle with a beam steering radar system 306 for transmitting a radar signal to scan a FoV or specific area. In various examples, the radar signal is transmitted according to a set of scan parameters that can be adjusted to result in multiple transmission beams 318. The scan parameters may include, among others, the total angle of the scanned area from the radar transmission point, the power of the transmitted radar signal, the scan angle of each incremental transmission beam, as well as the angle between each beam or overlap therebetween. The entire FoV or a portion of it can be scanned by a compilation of such transmission beams 318, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the vehicle 300 may also have other perception sensors, such as camera 302 and lidar 304. These perception sensors are not required for the vehicle 300, but may be useful in augmenting the object detection capabilities of the beam steering radar system 306, which has a reinforcement learning engine that is trained to detect and identify targets in the path and surrounding path of the vehicle, such as vehicles 310 and 314, which in this illustrated example are autonomous vehicles equipped with lidars 312 and 316, respectively.

In various examples and as described in more detail below, the beam steering radar system 306 is capable of providing a 360° true 3D vision and human-like interpretation of the vehicle's path and surrounding environment. The radar system 306 is capable of shaping and steering RF beams in all directions in a 360° FoV with at least one beam steering antenna. This enables the radar system 306 to recognize objects quickly and with a high degree of accuracy over a long range of around 300 meters or more. The short range capabilities of camera 302 and lidar 304 along with the long range capabilities of radar 306 enable a sensor fusion module 308 in vehicle 300 to advance the possibility of fully self-driving cars. The object detection and identification performance provided by the reinforcement learning engine in radar system 306 can be used to reduce or minimize the scan performance of the radar system 306, as the engine enables objects to be detected and identified with less stringent scan parameters for the radar 306 as it would otherwise be needed.

Figure 4:
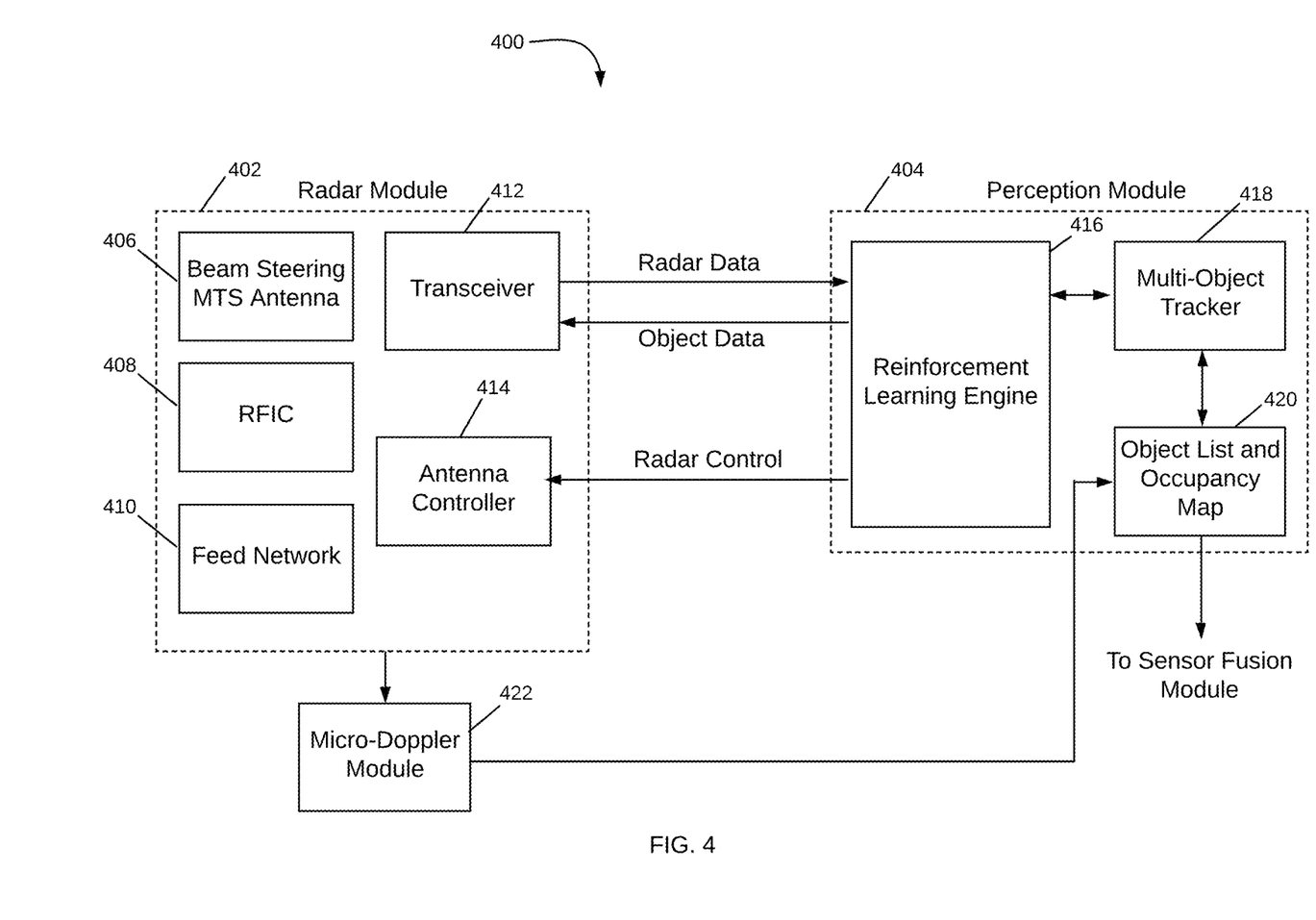
FIG. 4 is a schematic diagram of a radar system with a reinforcement learning engine for use in the autonomous driving system of FIG. 1 in accordance with various examples.

FIG. 4 illustrates a radar system with a reinforcement learning engine in more details. Radar system 400 is a "digital eye" with true 3D vision and capable of a human-like interpretation of the world. The "digital eye" and human-like interpretation capabilities are provided by two main modules: Radar Module 402 and Perception Module 404.

Radar module 402 includes at least one beam steering antenna 406 for providing dynamically controllable and steerable beams that can focus on one or multiple portions of a 360° FoV of a vehicle. In various examples, the beam steering antenna is an MTS antenna capable of radiating RF signals in millimeter wave frequencies. A meta-structure, as generally defined herein, is an engineered, non- or semi-periodic structure that is spatially distributed to meet a specific phase and frequency distribution. The meta-structure antenna may be integrated with various structures and layers, including, for example, feed network or power division layer 410 to divide power and provide impedance matching, RFIC 408 to provide steering angle control and other functions, and a meta-structure antenna layer with multiple microstrips, gaps, patches, vias, and so forth. The meta-structure layer may include, for example, a metamaterial layer. Various configurations, shapes, designs and dimensions of the beam steering antenna 406 may be used to implement specific designs and meet specific constraints.

Radar control is provided in part by the perception module 404. Radar data generated by the radar module 402 is provided to the perception module 404 for object detection and identification. The radar data is acquired by the transceiver 412, which has a radar chipset capable of transmitting the RF signals radiated by the beam steering antenna 406 and receiving the reflections of these RF signals. The transceiver module 412 prepares a signal for transmission, such as a signal for a radar device, wherein the signal is defined by modulation and frequency. The signal is provided to the beam steering antenna 406 through a coaxial cable or other connector and propagates through the structure for transmission through the air via RF beams at a given phase, direction, and so on. The RF beams and their parameters (e.g., beam width, phase, azimuth and elevation angles, etc.) are controlled by antenna controller 414, such as at the direction of perception module 404.

The RF beams reflect off of targets in the surrounding environment and the RF reflections are received by the transceiver module 412. Radar data from the received RF beams is provided to the perception module 404 for target detection and identification. The radar data may be organized in sets of Range-Doppler ("RD") map information, corresponding to 4D information that is determined by each RF beam radiated off targets, such as azimuthal angles, elevation angles, range and velocity. The RD maps are extracted from frequency-modulated continuous wave ("FMCW") radar pulses and they contain both noise and systematic artifacts from Fourier analysis of the pulses. The perception module 404 controls further operation of the radar module 402 by, for example, providing beam parameters for the next RF beams to be radiated from MTS radiating cells in the beam steering antenna 406.

In various examples, the transmission signals sent by transceiver module 412 are received by a portion, or sub-array, of beam steering antenna 406, which is an array of individual MTS radiating cells (e.g., an 8×16 array), wherein each of the cells has a uniform size and shape. In some examples, the MTS radiating cells may incorporate different sizes, shapes, configurations and array sizes. The MTS radiating cells include a variety of conductive structures and patterns, such that a received transmission signal is radiated therefrom. The MTS array in antenna 406 is a periodic arrangement of MTS cells that are each smaller than the transmission wavelength.

In some examples, the MTS cells may be metamaterial ("MTM") cells. Each MTM cell has some unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

Figure 5:
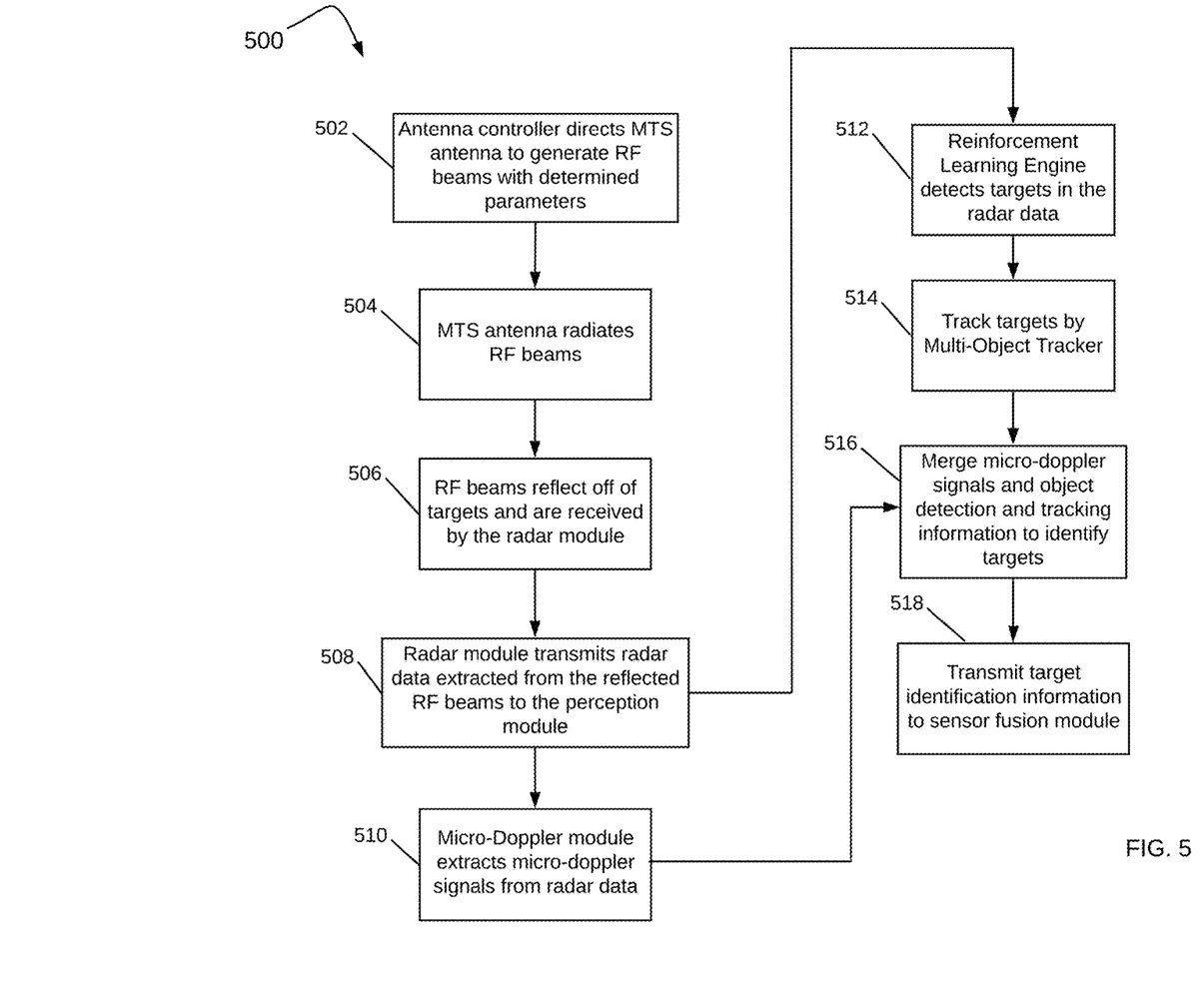
FIG. 5 is a flowchart illustrating the operation of a radar system implemented as in FIG. 4 in accordance with various examples.

FIG. 5 is a flowchart illustrating the operation of radar system 400 in more detail. In operation, the antenna controller 414 is responsible for directing the beam steering antenna 406 to generate RF beams with determined parameters such as beam width, transmit angle, etc. (502). The antenna controller 414 may, for example, determine the parameters at the direction of perception module 404, which may at any given time want to focus on a specific area of a field of view upon identifying targets of interest in the vehicle's path. The antenna controller 414 determines the direction, power, and other parameters of the beams and controls the beam steering antenna 406 to achieve beam steering in various directions. The antenna controller 414 also determines a voltage matrix to apply to RFIC 408 to achieve a given phase shift. In some examples, the beam steering antenna 406 is adapted to transmit a directional beam through active control of phase shifts provided by RFIC 408. The perception module 404 provides control actions to the antenna controller 414 at the direction of Reinforcement Learning Engine 416, described in more detail below.

Next, the beam steering antenna 406 radiates RF beams having the determined parameters (504). The RF beams are reflected off of targets in and around the vehicle's path (e.g., in a 360° FoV) and are received by the transceiver module 412 in radar module 402 (506). The radar module 402 then transmits 4D radar data to the perception module 404 (508). A micro-doppler module 422 coupled to the radar module 402 and the perception module 404 extracts micro-doppler signals from the 4D radar data to aid in the identification of targets by the perception module 404 (510). The micro-doppler module 422 takes a series of RD maps from the radar module 402 and extracts a micro-doppler signal from them. The micro-doppler signal enables a more accurate identification of targets as it provides information on the occupancy of a target in various directions.

The reinforcement learning engine 416 receives the 4D radar data from the radar module 402, processes the radar data to detect and identify targets, and determines the control actions to be performed by the radar module 402 based on the detection and identification of such targets (512). For example, the reinforcement learning engine 416 may detect a cyclist on the path of the vehicle and direct the radar module 402, at the instruction of its antenna controller 414, to focus additional RF beams at given phase shift and direction within the portion of the field of view corresponding to the cyclist's location.

The perception module 404 also includes a multi-object tracker 418 to track the identified targets over time, such as, for example, with the use of a Kalman filter (514). Information on identified targets over time are stored at an object list and occupancy map 420, which keeps tracks of targets' locations and their movement over time as determined by the multi-object tracker 418. The tracking information provided by the multi-object tracker 418 and the micro-doppler signal provided by the micro-doppler module 422 are combined to produce an output containing the type of target identified, their location, their velocity, and so on (516). This information from radar system 400 is then sent to a sensor fusion module such as sensor fusion module 112 of FIG. 1, where it is processed together with object detection and identification information from other sensors in the vehicle (518).

Figure 6:
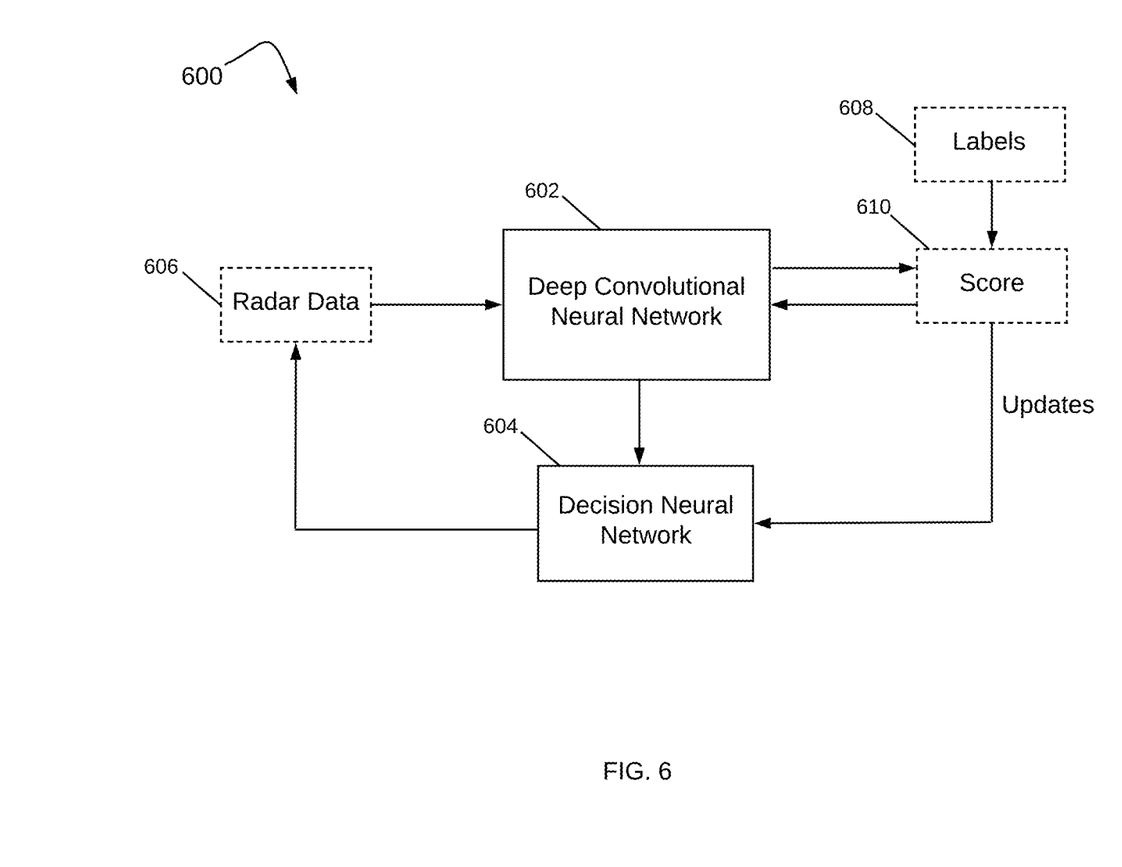
FIG. 6 is a schematic diagram of a reinforcement learning engine implemented as in FIG. 4 in accordance with various examples.

Attention is now directed to FIG. 6, which shows a schematic diagram of a reinforcement learning engine of FIG. 4 in accordance with various examples. Reinforcement learning engine 600 has two neural networks: deep Convolutional Neural Network ("CNN") 602 and Decision Neural Network ("DNN") 604. CNN 602 takes in radar data 606 and provides output data detecting targets, identifying them (e.g., whether a vehicle, pedestrian, cyclist, wall, etc.), their location, velocity, and other identifying information. DNN 604 is a Q-learning network that receives the output data from CNN 602 and determines an action for the radar module 402 to perform, such as, for example, to steer RF beams to a given direction in its FoV.

In various examples, CNN 602 is a fully convolutional neural network ("FCN") with three stacked convolutional layers from input to output (additional layers may also be included in CNN 602). Each of these layers also performs the rectified linear activation function and batch normalization as a substitute for traditional L2 regularization and may include up to 64 filters. As a preliminary step to processing the radar data 606, a sparse point cloud representation of the data may be generated with a dynamic threshold. Doing so encodes much higher resolution radar data while still retaining computational efficiency. Targets are shown in the point cloud representation as voxels, which are values in the multi-dimensional space of the radar data 606 (e.g., containing range, velocity, azimuth and elevation angles).

Figure 7:
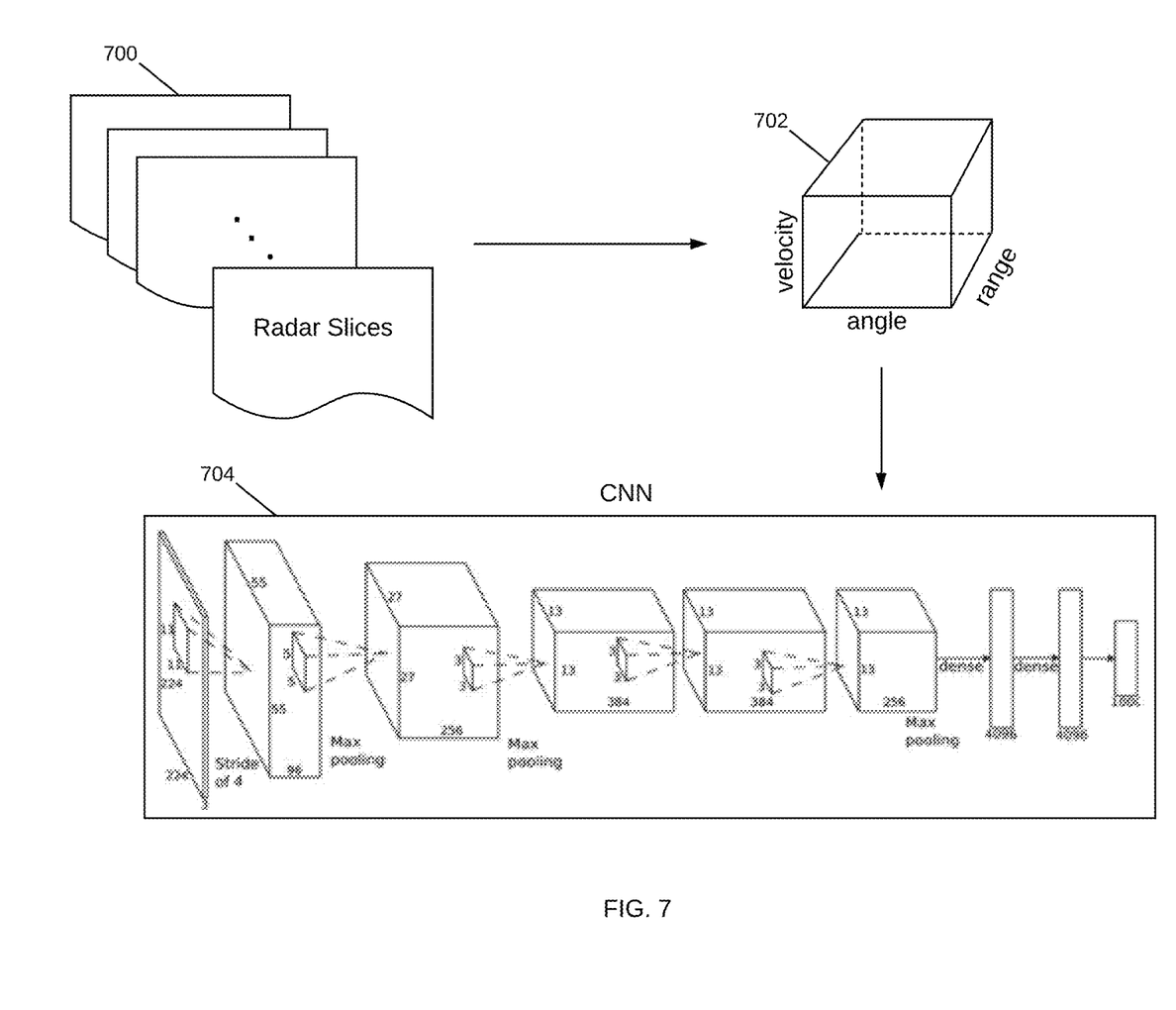
FIG. 7 illustrates radar data and a convolutional neural network for use in a reinforcement learning engine implemented as in FIG. 4 in accordance with various examples.

FIG. 7 illustrates the CNN 602 in more detail. Each radar slice 700 represents the range-Doppler information of a radar scan acquired by the radar module 402 of FIG. 4. These radar slices are compiled into a cube of radar data 702, which may represent a full scan across the azimuth or a full 3D scan of the FoV, and so forth. The radar data cube 704 is input into CNN 704, implemented as in CNN 602. The CNN 602/704 uses small regions of a visual field and identifies edges and orientations in the field, much like a filter for an image. The image goes through a series of convolutional, nonlinear sampling through layers, resulting in a probability. The layers include a convolutional layer that looks at these small regions individually, referred to as receptive fields. The filter process incorporates weights in connections between layers, and when the original information is passed through this layer, the result is a reduced set of data, referred to as a feature map. The feature map identifies objects detected in each receptive field. Note that there may be any number of feature maps as a function of features used in processing. The layers of the CNN 602 detect a first level of features, such as edges. The output of each layer feeds the next layer, which detects a second level of feature, such as a square. At the output of each layer in CNN 602 is a feature map identifying the locations of those features. And as data processes through CNN 602, the layers become more complex to further refine the specific target until the target can be properly identified (e.g., as a pedestrian, cyclist, animal, wall, vehicle, etc.). The final layer of the CNN 602 is a fully connected layer that takes an input feature map and outputs an N-dimensional vector, where N is the number of features or classes. Each number of the N-dimensional vector identifies the probability of each corresponding feature.

It is noted that CNN 602 may incorporate other information to help it identify targets in the vehicle's path and surrounding environment. For example, when a target is moving slowly and outside of a road line, it is likely that the target may be a pedestrian, animal, cyclist, and so on. Similarly, when a target is moving at a high speed, but lower than the average speed of other vehicles on a highway, CNN 602 may use this information to determine if the target is a bus or a truck, which tend in general to move more slowly. The location of a target, such as in the far-right lane of a highway, may also provide an indication as to whether the target may be a slower-moving type of vehicle. If the movement of the target does not follow the path of a road, then the target may be an animal, such as a deer crossing the road. All of this information may be determined from a variety of sensors (e.g., in sensor systems 104 of FIG. 1 and in the radar system 102 described herein) and other information available to the vehicle, including information provided from weather and traffic services, other vehicles or the environment itself, such as smart roads and smart traffic signals. The sensor fusion module 112 analyzes all the information available from the sensors to more accurately detect and identify each target.

Figure 8:
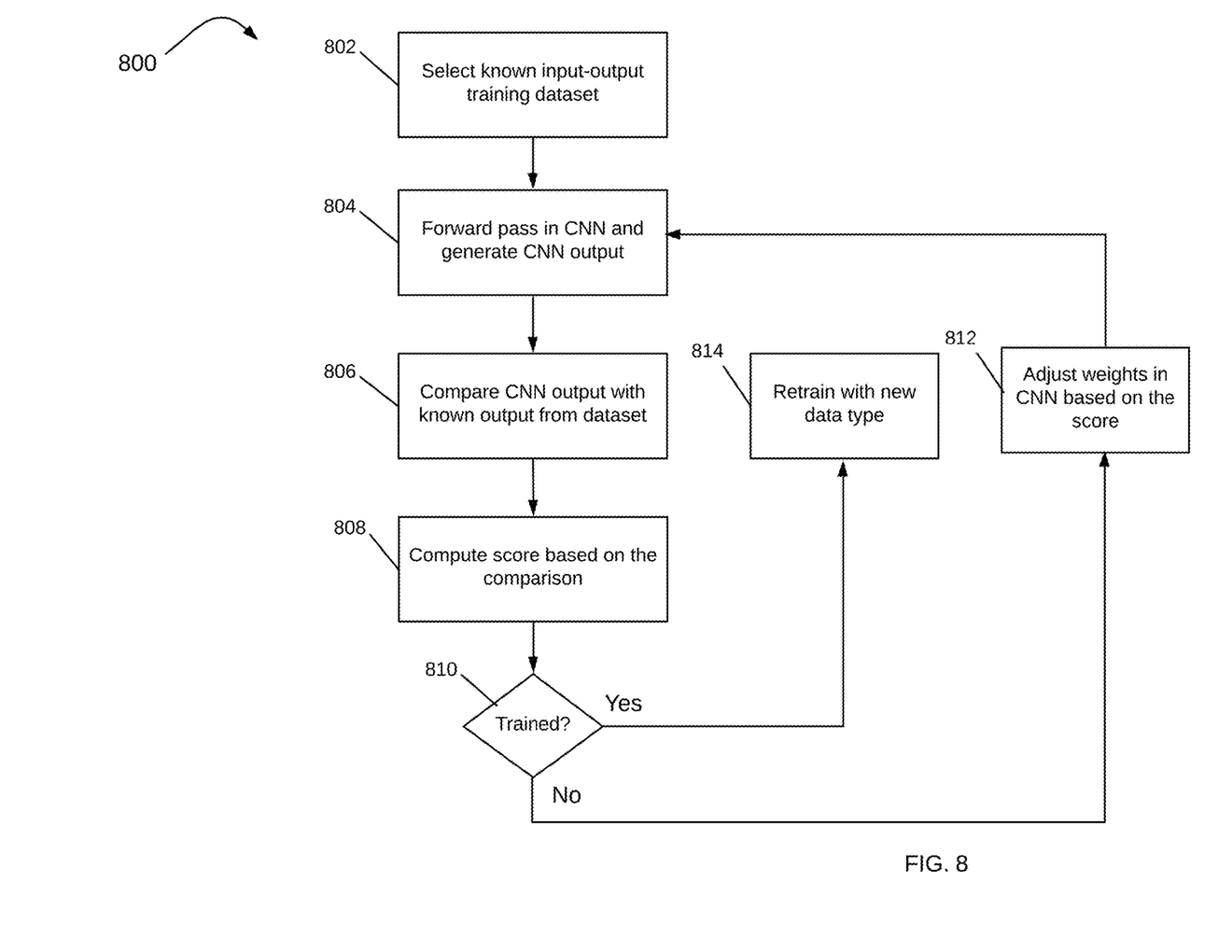
FIG. 8 is a flowchart illustrating the steps for training the CNN of FIG. 6.

The operational accuracy of the CNN 602 is determined by several factors, and one is the training process that provides feedback to the network to adjust its weights; this process is called backpropagation. A flowchart illustrating the steps for training the CNN 602 is shown in FIG. 8. The CNN 602 trains on known sets of input-to-output data. For example, an input may be the camera data received from a camera sensor at time t1. The known input-output dataset is selected as either raw data or may be synthetic data; the data is digitized, and specific parameters extracted (802). The data may also be compressed or pre-processed. Either way, there is a set of input data received from a sensor. The CNN 602 does a forward pass through each one of its layers, computing each layer output based on the weights in the layer, and passing the output to the next layer (804). The output data of CNN 602 is then what information you would like the CNN 602 to provide you when it receives this set of sensor data, i.e., the output of CNN 602 will be in the same form as the known output of the selected data. Its value, however, may differ from the known output. The next step is to compare the output of CNN 602 with the known, expected output from the selected dataset (806). This can be implemented in a number of ways, such as by Euclidean distance, cross entropy, weighted cross entropy, and other such measures.

A score 610 is determined as an indication of how close the output of CNN 602 matches the expected output (808). Steps 804-808 iterate until the scores indicate that the network is trained (810), that is, until an error tolerance for the scores is small enough and the outputs of CNN 602 given the known inputs are within a desired tolerance from the known outputs. If they are not, then the score 610 is sent back to the CNN 602 to adjust its weights (812) and steps 804-808 continue to iterate. Training of CNN 602 is therefore an iterative process, which terminates when the output of the network is sufficiently close to the desired results. There are a variety of methods to adjust the weights in the CNN. The goal is to have a CNN 602 that can receive any sensor information (e.g., radar data 606) and predict the targets and environment as closely as possible.

In various examples, the CNN 602 may be trained on one type of data (e.g., lidar point cloud data, radar synthetic data, etc.) and then retrained (814) to adapt to a new set of data (e.g., radar data). Retraining may be done using a combination of synthesized data and real sensor data. Real sensor data may be labeled with labels 608, which are, for example, bounding boxes placed around known items in view in each multi-dimensional slice of the radar data.

As shown in FIG. 6 and described above, the output of CNN 602 is sent to DNN 604 so that DNN 604 can determine an action for the radar module 402 to perform, such as, for example, to steer RF beams to a given direction in the field of view. In order to select the best action, DNN 604 is trained based on reinforcement learning, a machine learning technique inspired by behavioral psychology. The idea is to have DNN 604 choose an action for a given state such that its reward is maximized. In this case, the state is the output of the CNN 602, the action is a selection of beam parameters for the radar module 402 to know where to direct its next beams with the selected parameters (e.g., beam width, direction, etc.), and the reward is the performance of the DNN 604 following the selections.

Training the DNN 604 boils down to indicating to the DNN 604 when it is doing well and when it is doing poorly. For example, reinforcement learning is used to train dogs. You cannot tell the dog what to do, but over time the dog will understand that certain actions lead to more rewards. The rewards are also not the same; some rewards may be more likely or desirable than others. The goal of DNN 604 is then to maximize its expected future reward of an action given a state. Training of DNN 604 is accomplished by teaching the DNN 604 to have the optimal representation of the space of states, actions, and rewards.

Figure 9:
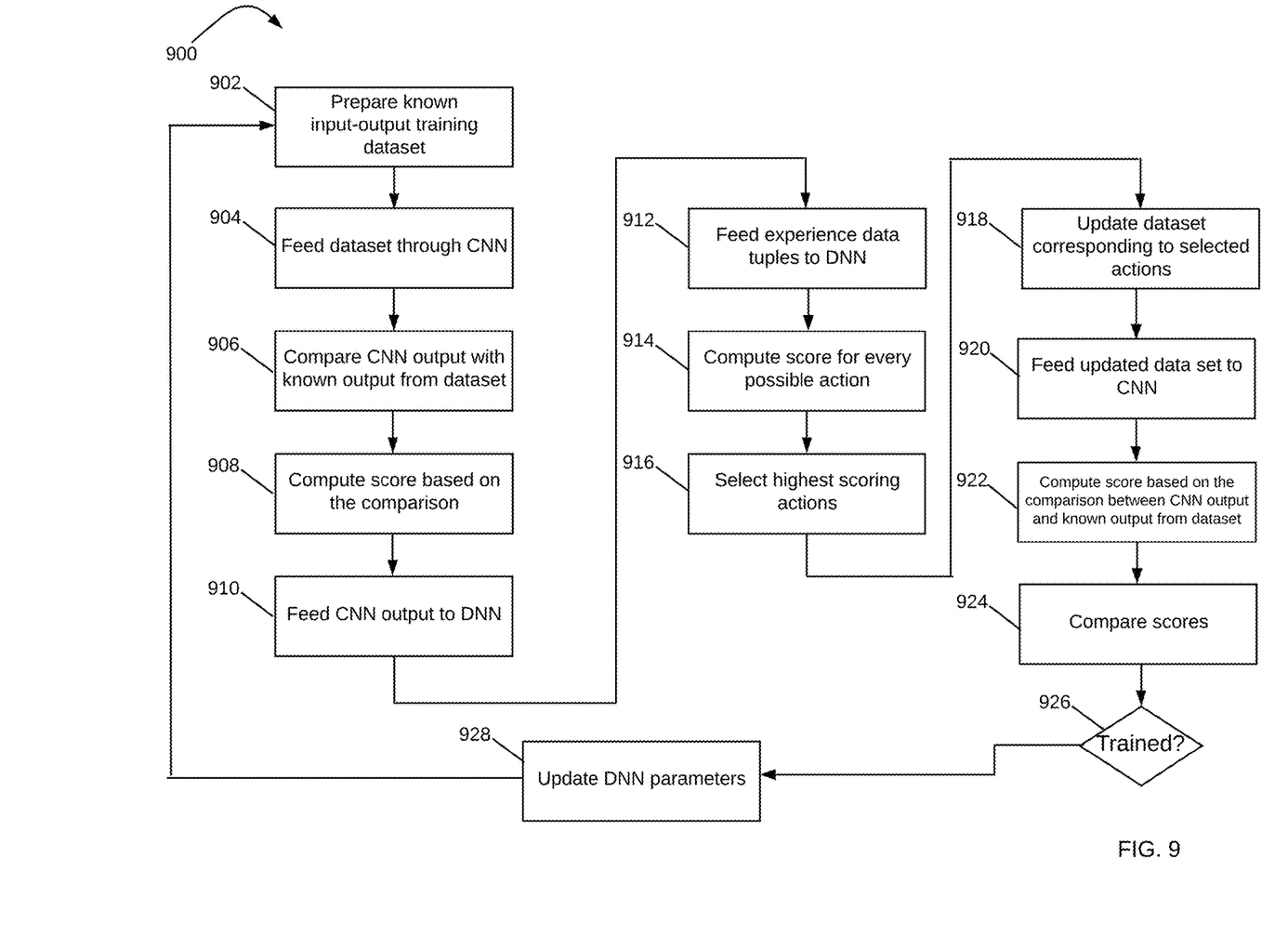
FIG. 9 is a flowchart illustrating the steps for training the DNN of FIG. 6.

Attention is now directed to FIG. 9, which illustrates a flowchart for training the DNN 604 of FIG. 6. The first step in training 900 is to prepare a known input-output training dataset (902). The dataset can include synthetic and/or real data output by a radar system such as radar system 102 of FIG. 1 and radar system 400 of FIG. 4. As described above, the data from these radar systems is multi-dimensional and includes measures such as range, velocity, azimuth and elevation for each beam. In training DNN 604, a full 4D data set can be used, or alternatively, DNN 604 may be trained with a smaller dimensional set. In one example, the dataset used in training is a 4D hybercube; in other examples, a 3D data cube is used by scanning data at a fixed elevation (e.g., zero or other elevation) and recording the range, velocity and azimuth angles.

Let this dataset be represented by a cube or hypercube denoted by M In each orientation of a beam, a sequence of pulses is collected to contain sufficient information to fill one slice of M. This dataset may be referred to as the "raw data cube," as it contains information which may be prepro- cessed, but has not yet been fed to any machine learning components. Out of this dataset, a set of k directions is selected. The selection may be performed randomly or in other ways. Each of the k directions is associated with known outputs. That is, the dataset may be prepared by generating beams in the radar system in the k directions in a road-like environment, recording the reflections from known targets, and labeling the data with bounding boxes around the targets so that each target's location and type (e.g., vehicle, wall, pedestrian, animal, cyclist, etc.) is known. Alternatively, the dataset may contain a set of known input-output pairs representing a real-world scenario of a vehicle in a road.

The raw data cube containing data corresponding to these k directions is then fed through the CNN 602 (904). The output of CNN 602, which may have already been trained, is compared with the known output from the selected dataset (906). A score is computed based on the comparison (908). In various examples, a single score may be computed for each direction; in other examples, a composite score may be computed for the k directions. The output of the CNN 602 is input into the DNN 604 (910). The DNN 604 also has a set of experience data tuples of [state, action, reward, next-state] (912). The state, as described above, corresponds to the output of the CNN 602, the action corresponds to a selected set of beam parameters, and the reward is a desired performance measure following the selections. In various examples, the reward may be a function such as:

$$r \propto \ln\left(\frac{loss_i}{loss_{i-1}}\right) \tag{Eq. 1}$$

where loss may be a measure such as Euclidean distance, weighted binary cross entropy, or another such measure. Note that loss is not used directly, so as not to punish good actions taken in bad situations and vice-versa.

During training, DNN 604 is run to explore the action space with a fixed probability of taking random actions. Each experience data tuple is then recorded as it's encoun- tered and stored in a buffer of fixed length (e.g., of a length of $10^5$). DNN 604 is trained by sampling mini-batches randomly from this buffer and computing a state-action Q function known in Q-learning as the Bellman equation:

$$Q(s,a)=r+\gamma \max_{a'} Q(s',a') \tag{Eq. 2}$$

where $\gamma$ is a discount rate for the rewards between 0 and 1 to take into account the fact that not all rewards are the same: the larger the value of $\gamma$, the smaller the discount (i.e., DNN 604 cares more about the long-term reward), and the smaller the $\gamma$, the bigger the discount (i.e., DNN 604 cares more about the short-term reward). Conceptually, Eq. 2 states that the maximum future reward for state s and action a is the immediate reward r plus the maximum future reward for the next state. The Q function may be implemented as the buffer, with states as rows and actions as columns. In various examples, for computing the maximum future reward for the next state (i.e., $\gamma \max_{a'} Q(s', a')$), previous, frozen versions of DNN 604 are used to avoid instabilities and oscillations during training. Furthermore, because DNN 604 is expected to require less forward planning than many Q-learning applications, the discount rate $\gamma$ is initially set to 0 and gradually increased during training. This technique helps the network converge more rapidly and has not been introduced in the Q-learning literature.

Based on Eqs. 1-2, DNN 604 computes a score for every possible action (914). In deterministic operation, the k highest scoring options are selected (916) and the dataset is updated with data corresponding to the selected actions (918). The updated data set is fed to the CNN 602 (920), which once again produces a score based on the comparison between the output of CNN 602 and the known, expected output from the dataset (922). This score is compared to the previous score, and based on this comparison, it is deter- mined that the k selections made by DNN 604 were either good or bad (824). Depending on this determination, DNN 604 may be considered to be trained (926), but if not, its parameters are updated (828), and training continues with further data.

It is appreciated that while the operation of DNN 604 may occur at a framerate that may require selecting more than one beam at a time, during training the space of actions may be restricted to the selection of a single beam. This is because it is desired to attribute a change in score to a particular action, rather than an average score to a group of actions. To match the framerate goals, the simulated world is frozen for k steps before advancing, so that the effect is to select k beams during each timestep as will be done during inference with DNN 604.

It is also appreciated that an additional training mode may be enabled: alternate or simultaneous training of DNN 604 and CNN 602. Alternatively, CNN 602 and DNN 604 may be first trained with one type of data (e.g., lidar data) and retrained with radar data. The networks CNN 602 and DNN 604 may also be trained with real, labelled data in a real-world subsampling scenario. In this case, rather than being able to choose any of the possible actions, the action space may be restricted to the subset of actions that were actually taken. Having selected one of these actions, training proceeds as before. If done entirely asynchronously, this constitutes an "off-policy" approach. However, this process may be iterated a number of times, where each new dataset is collected using the latest policy network.

These various examples support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. Sensor performance is also enhanced with these structures, enabling long-range and short-range visibility. In an automotive application, short-range is considered within 30 meters of a vehicle, such as to detect a person in a cross walk directly in front of the vehicle; and long-range is considered to 250 meters or more, such as to detect approaching cars on a highway. These examples provide automotive radars capable of reconstructing the world around them and are effectively a radar "digital eye," having true 3D vision and capable of human-like interpretation of the world.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An autonomous driving system in a vehicle, comprising:
   a beam steering antenna comprising an array of radiating cells;
   a radar system configured to control the beam steering antenna and identify targets in a path and a surrounding environment of the vehicle with a reinforcement learning engine of the radar system that comprises at least one neural network, wherein the reinforcement learning engine provides control of the beam steering antenna in response to the identified targets in the path and the surrounding environment of the vehicle; and
   a sensor fusion module for receiving information from one or more sensors in the vehicle, the sensor fusion module configured to receive information of the identified targets from the reinforcement learning engine of the radar system and compare the information from the one or more sensors with the information of the identified targets.

2. The autonomous driving system of claim 1, wherein the beam steering antenna is a meta-structure antenna and the radiating cells comprises radiating meta-structure cells.

3. The autonomous driving system of claim 1, wherein the at least one sensor comprises at least one of a camera or a lidar.

4. The autonomous driving system of claim 1, wherein the at least one neural network of the reinforcement learning engine comprises a convolutional neural network and a decision neural network.

5. The autonomous driving system of claim 4, wherein the convolutional neural network is configured to receive a radar data cube containing data of a radar scan and identify the targets from the received data.

6. The autonomous driving system of claim 4, wherein the convolutional neural network is trained on one type of data and is re-trained on another type of data.

7. The autonomous driving system of claim 4, wherein the convolutional neural network comprises a set of adjustable weights, the weights adjusted according to a computed score.

8. The autonomous driving system of claim 4, wherein the decision neural network determines a selection of beam parameters for the radar system based on an output received from the convolutional neural network.

9. The autonomous driving system of claim 8, wherein the beam parameters comprise at least one of a beam width or a beam direction.

10. A radar system, comprising:
    a radar module having an antenna controller and a meta-structure beam steering antenna configured to radiate a plurality of radio frequency (RF) beams under control of the antenna controller; and
    a perception module having a reinforcement learning engine that comprises at least one neural network, wherein a control action for the antenna controller is determined with the at least one neural network of the reinforcement learning engine of the perception module, wherein the reinforcement learning engine provides control of the meta-structure beam steering antenna in response to a detected and identified target in a path and a surrounding environment of the radar system.

11. The radar system of claim 10, further comprising a radio frequency integrated circuit (RFIC) configured to provide steering angle control of the meta-structure beam steering antenna.

12. The radar system of claim 11, wherein the least one neural network of the reinforcement learning engine comprises a convolutional neural network and a decision neural network.

13. The radar system of claim 12, wherein the decision neural network is configured to determine a selection of beam parameters for the radar system based on an output received from the convolutional neural network.

14. The radar system of claim 13, wherein the beam parameters comprise at least a beam direction transmitted to the antenna controller.

15. The radar system of claim 14, wherein the beam direction indicates a steering angle for the RFIC.

16. The radar system of claim 10, further comprising a transceiver configured to provide radar data from a radar scan to the perception module.

17. The radar system of claim 16, wherein one or more targets from the received radar data is identified via the least one neural network of the reinforcement learning engine.

18. A method for operating a radar system in an autonomous driving system, the method comprising:
- directing a meta-structure antenna structure to transmit radio frequency (RF) beams with determined parameters;
- receiving reflected RF beams from targets within a distance of the autonomous driving system;
- identifying the targets with a reinforcement learning engine comprising at least one neural network;
- tracking the targets with a multi-object tracker; and
- transmitting the target identification to a sensor fusion in the autonomous driving system.

19. The method of operating a radar system of claim 18, wherein the at least one neural network of the reinforcement learning engine comprises a convolutional neural network and a decision neural network, and wherein identifying the targets with the reinforcement learning engine comprises providing a radar data cube to the convolutional neural network that identifies the targets and determining a control action for the meta-structure antenna with the decision neural network.

20. The method of operating a radar system of claim 19, further comprising training the decision neural network that maximizes a reward based on an output from the convolutional neural network.

* * * * *